United States Patent [19]
Miles et al.

[11] 3,801,066
[45] Apr. 2, 1974

[54] CRYOGENIC BUTTERFLY VALVE

[75] Inventors: Michael E. Miles, Northboro; James F. Donnelly, Worcester, both of Mass.

[73] Assignee: Jamesbury Corp., Worcester, Mass.

[22] Filed: July 1, 1971

[21] Appl. No.: 158,699

[52] U.S. Cl. .............................................. 251/306
[51] Int. Cl. ........................................... F16k 1/228
[58] Field of Search ..................... 137/171, 173, 306

[56] References Cited
UNITED STATES PATENTS

| | | | |
|---|---|---|---|
| 3,608,861 | 9/1971 | Helman et al. | 251/306 |
| 2,974,921 | 3/1961 | Kaswan | 251/173 X |
| 3,260,496 | 7/1966 | Borcherdt | 251/171 |

*Primary Examiner*—Henry T. Klinksiek
*Attorney, Agent, or Firm*—Shaffert, Miller & Browne

[57] ABSTRACT

Disclosed is a butterfly valve particularly adapted for service with cryogenic fluids at temperatures down to −320° F and lower wherein a butterfly valve is provided with a seat that has a configuration that permits the seat to shrink upon exposure to lowered temperatures and to engage a protrusion in the valve housing. The forces generated by the shrinkage of the seat and the engagement with the protrusion cause the seat to deform in a controlled manner and maintain sealing engagement with the butterfly disc despite the dimensional changes of the valve components attributable to exposure to the cryogenic fluid.

14 Claims, 3 Drawing Figures

PATENTED APR 2 1974 3,801,066

INVENTORS,
MICHAEL E. MILES
JAMES F. DONNELLEY

CRYOGENIC BUTTERFLY VALVE

CROSS-REFERENCE TO RELATED APPLICATIONS

This application is related to U.S. application Ser. No. 732,729, filed May 28, 1968, for "Butterfly Valve Seat" by David A. Helman, Michael E. Miles and James F. Donnelly, now allowed, and U.S. Pat. No. 3,591,133, issued July 6, 1971, for "Butterfly Valve" by Michael E. Miles and James F. Donnelly.

BACKGROUND OF THE INVENTION

This invention relates to rotary fluid control valves of the butterfly valve type. Many of these valves have a circular fluid flow channel therethrough and a circular disc mounted for rotation between an open position, in which the disc lies substantially parallel to the axis of the fluid flow channel through the valve, and a closed position in which the disc lies perpendicular to this axis.

The disc edge contacts an annular seat circumscribing the fluid flow channel, when the valve is in the closed position, and the sealing contact between these members will shut off fluid flow through the channel.

When a butterfly valve of the type just described is employed in applications wherein the fluid to be controlled is a cryogenic fluid, many criteria must be met in order to assure an acceptable sealing action between the disc and the seat. Cryogenic fluids, such as liquid oxygen, liquid helium, liquefied natural gas and the like, will cause the various components of the valve to contract when the liquid comes in contact with these components. Some components of the valve, such as the housing and the disc, are generally made of metal and other components of the valve, such as the seat ring, are made of materials that are more resilient, at least at ambient temperatures. Due to differences in the coefficients of expansion and contraction of these various materials, exposure to extreme cold will cause the valve components to shrink different amounts and at different rates. Designers of past cryogenic butterfly valves have been troubled by the necessity to compensate for this uneven component shrinkage yet retain the sealing action between the disc and the seat and the valve housing and the seat.

Several attempts have beem made in the past to design a butterfly valve suitable for cryogenic service, but the designs have been complicated in form and expensive to manufacture.

As an example of prior cryogenic butterfly valves, attention is directed to U.S. Pat. No. 3,260,496, issued on July 12, 1966 for "Thermal Responsive High Pressure Butterfly Valve Seal Means" by Walter O. Borcherdt. The valve disclosed in this patent has a seat assembly that is characterized by the inclusion of a retaining or backing member, an annular metal spring and a pressure ring, all in addition to the resilient sealing member. Such components add to the complexity and cost of the butterfly valve.

It is an object of the present invention to provide a butterfly valve suitable for service with cryogenic fluids, yet provide a simple structure with improved sealing characteristics.

Other objects will be apparent from a consideration of this disclosure.

SUMMARY OF THE INVENTION

The butterfly valve of this invention is of a type wherein the butterfly disc element is mounted on a shaft for rotation about an axis perpendicular to the axis of the fluid flow channel. The butterfly disc has a flange extending from one planar surface thereof and the shaft passes through and is attached to this flange so that the disc edge will form an unbroken sealing surface circumscribing the entire circumference of the disc. The annular seat member circumscribes the fluid flow channel and is located so that it will cooperate with the disc sealing surface when the valve disc is closed.

The just-described eccentric mounting of the disc on the shaft allows the sealing surface on the disc edge to completely lift off of the resilient seat after a relatively small rotation of the shaft. For butterfly valves in cryogenic service, it is important to note that when the valve is in the open position, the cryogenic fluid is passing through the valve and exposing all parts of the seat ring to the extreme cold of the fluid. If the edge of the open disc was contacting the seat at two different locations, the deformation of the seat caused by the contact of the disc would be set into the seat by the extreme cold. In such an instance, when the disc would be rotated to a closed position to shut off the flow of the liquid, the deformed portion of the seat would not properly mate with the sealing surface on the disc and a leakage path would be established. Thus, it can be seen that the total absence of contact between the seat ring and the open disc is a definite advantage when the valve is used in cryogenic service.

The bearings between the valve housing and the disc shaft will be a material that is capable of withstanding exposure to the extreme cold of cryogenic fluids. An example of such a material would be a bearing of glass-fiber-filled Teflon (polytetrafluroethylene), mechanically bonded to a stainless steel backing.

The bonnet of the valve, upon which the actuating device may be mounted, is separated from the valve by a relatively long extension of the valve housing and the disc shaft. In this manner, the actuator is physically separated from the portion of the valve carrying the cryogenic fluid and is protected from the effects of the temperature of the fluid.

A groove is provided in the valve housing for the seat ring. The groove may be the space formed between facing surfaces of two elements, one element being the valve housing itself and another element being a metal ring that fits into a recess formed in the housing. One side of the groove has a projection or a lug extending, when seen in cross section, in a direction parallel to the longtitudinal axis of the flow channel of the valve. The other side of the groove is substantially smooth, as is the surface forming the interiormost face of the groove. This latter surface may be referred to, as seen in cross section, as the bottom of the seat ring groove. The seat groove will extend a full 360° around the interior of the valve housing. The sealing surface on the disc is an unbroken circular surface because the shaft is offset from the sealing surface on the disc and consequently the seat ring will have a sealing surface that extends a full 360° around the interior of the valve housing.

The seat engaging surface formed on the outer edge of the disc is a portion or a segment of a converging surface and the convergence occurs at a point on the extension of the fluid flow axis. For example, the circumscribing sealing surface on the edge of the disc may be a frustum of a cone or a segment of a sphere or a spheroid.

It should be noted that the means employed to fasten the valve disc to the valve shaft should pass through the flange or gudgeon on the disc in a direction parallel to the plane of the face of the disc. In other words, fastening pins or similar fastening means should not pass perpendicularly through the face of the disc and create the danger of a leakage path through the disc when the valve is closed.

The seat ring employed in the valve of the present invention must be of a material that is able to withstand exposure to the extreme cold of cryogenic fluids without breaking or shattering. An example of such a material is polychlorotrifluorethylene sold under the name Kel-F.

The seat ring itself must have an outside diameter of a size that will fit in the previously discussed groove formed in the housing.

The portion of the seat ring that fits in the groove may be referred to as the heel of the seat and the thickness of this heel portion should slightly exceed the width of the groove formed in the valve housing. It is important to recognize that the entire sealing ring will shrink when exposed to the extreme temperatures of the cryogenic fluid. Consequently, the thickness of the heel portion of the sealing ring should be related to the width of the valve housing groove in a manner that will permit relative movement between the seat ring and the groove while the seat is shrinking.

The seat ring has a notch or groove formed therein at a location that will cooperate with the previously discussed projection or lug on the valve housing. The thickness of the seat ring at this notch should be such that a slight interference fit will exist between the nose or end of the lug and the seat ring when the ring is installed in the valve. This interference fit will assure sealing action between the seat and the valve housing, despite the fact that some relative motion is permitted between the heel of the seat ring and the housing when the seat ring is shrinking.

The groove or notch in the seat is somewhat wider than the width of the lug on the valve housing. When the seat is placed in the valve housing at ambient temperature, the lug will project into the groove at a position that provides a small clearance on both sides of the lug.

The sealing ring has a sealing face or lip adapted to cooperate with the circumferential sealing surface on the valve disc. This lip may also be a segment of a converging surface similar to the sealing surface on the edge of the disc but, as seen in cross section, the sealing surface on the lip of the seat ring is of such an angle and an inside diameter to create an interference fit over at least a portion of the cooperating surfaces of the seat ring and the disc when the valve is closed. This interference fit will exist at ambient temperature so that good sealing action may be obtained when the cryogenic fluid first comes in contact with the closed disc and valve seat and this sealing action will be retained during the period of time in which the temperature of the valve components is dropping to a temperature substantially the same as the cryogenic fluid.

As previously mentioned, exposure of the seat ring and the valve disc to the extreme cold of the cryogenic fluid causes both of these elements to shrink. In order to maintain effective sealing action between the seat ring and the disc, it is necessary to maintain the contact between these surfaces while the respective components of the valve are shrinking and then to maintain this contact after the valve itself drops to a temperature substantially the same as the cryogenic fluid.

As the seat ring of the present invention shrinks under the influence of the cryogenic fluid, the radially outermost portion of the groove formed in the seat contacts the lug or protrusion formed on the valve housing. The groove is formed through only a portion of the heel of the seat ring and, when viewed in cross section, the side of the ring that is in contact with the lug has stresses induced therein during the shrinkage.

The other side of the seat ring that is in contact with the smooth surface of the groove continues to shrink and is not impeded by any protrusions on the housing. The net result of these forces is a controlled movement during shrinkage that will pivot the seal around the lug in the direction towards the inclined sealing surface on the disc edge.

The pivoting action of the seat into the disc as both elements are shrinking will maintain the sealing action between the sealing surfaces. Care must be taken to avoid too large a force between the pivoting seat and the disc edge because such a force will require a high actuator torque to turn the disc. The amount of torque necessary to turn the butterfly disc should not greatly increase when the valve gets cold.

Further features of the invention will be apparent from a consideration of the detailed description of a preferred embodiment of our butterfly valve and a consideration of the accompanying drawing.

It should be noted that although the discussion above has been directed to a butterfly valve, other rotary valves such as a ball valve may also employ the teachings of the instant invention.

DESCRIPTION OF THE PREFERRED EMBODIMENT

Figure 1:
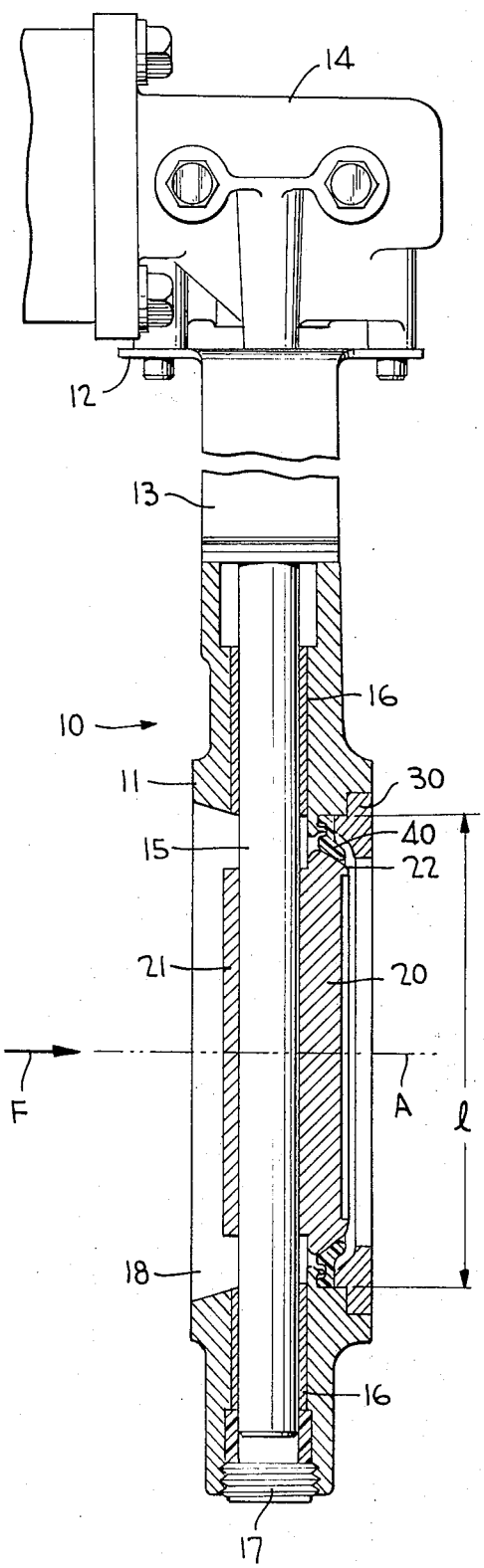
FIG. 1 is an elevation view, partially in cross section, of the butterfly valve of the instant invention.

FIG. 1 illustrates a butterfly valve indicated generally by the numeral 10. This valve has a housing 11 with a bonnet 12 attached thereto by an extended connecting member 13. A powered valve operator 14 is shown attached to bonnet 12 although it is to be understood that the details of the valve actuating mechanism are not relevant to this invention. The connecting member 13 is illustrated in FIG. 1 as separated by jagged lines to indicate that the length of element 13 is sufficient to separate the valve actuator 14 from the extremely low temperatures present in the portion of the valve carrying the cryogenic fluid.

Shaft 15 passes through appropriate bearings 16 in the valve housing and must also be of a length that will permit one end of the shaft to be associated with valve actuator 14. The other end of the shaft extends through a lower bearing hole in valve housing 11 and this hole is closed by plug 17.

Butterfly disc 20 is attached to shaft 15 in an offset or eccentric manner by means of a flange 21 extending from one planar surface of the disc. Suitable fastening means such as pins (not shown) may pass through flange 21 and shaft 15 but the pins should be in a plane parallel to the face of the disc rather than perpendicular to the face of the disc so that no holes are formed through the disc. Fastening holes passing through the face of the disc create potential leak paths when the disc is closed and consequently are to be avoided.

A converging sealing surface 22 circumscribes the butterfly disc and converges, as seen in FIG. 1, towards a point located on an extension of the axis A of the flow path passing through the valve.

Seat ring 40 is positioned in a groove in housing 11 in a manner to be described more completely below and presents a sealing face that cooperates with face 22 on disc 20. It is noted that the valve in FIG. 1 is intended for use with cryogenic fluid flowing in a direction indicated by arrow F.

A groove is provided in the valve housing for the seat ring 40. This groove may be the space formed between facing surfaces of a portion of valve housing 11 and a portion of a metal ring 30 that fits into a specially formed recess in housing 11.

Figure 3:
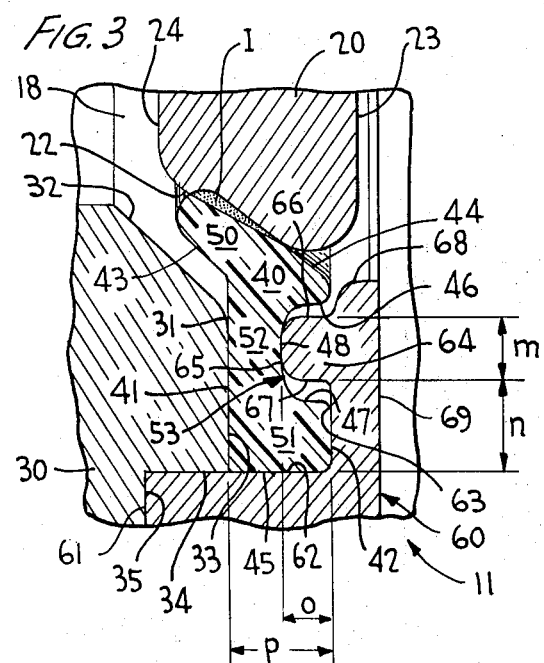
FIG. 3 is a cross sectional view of the portions of the valve housing, the valve seat ring and the valve disc as they are related to each other when the valve is in the closed position.

FIG. 3 illustrates an enlarged cross sectional view of seat 40 installed in the seat receiving groove in the valve housing and in contact with sealing surface 22 of butterfly disc 20.

Seat receiving groove is bounded on one side by a portion of a metal ring 30 and is bounded on the bottom and the other side by various surfaces of portion 60 of valve body 11. A portion of ring 30, with particular reference to FIG. 3, has a vertical face 33 that is bounded on the top by inclined surface 32 and bounded on the bottom by horizontal surface 34 and vertical step surface 35. Vertical step surface 35 and horizontal surface 34 are designed to mate with surfaces 61 and a portion of surface 62, respectively, both formed on portion 60 of valve housing 11.

Surface 33 of ring 30 constitutes a smooth wall on the left-hand side of the groove as visible in FIG. 3 and that portion of surface 62 that is not in contact with surface 34 of ring 30 constitutes the bottom surface of the seat receiving groove. It is noted that the transitional corner 31 between surfaces 32 and 33 on ring 30 is cut with a smooth radius so that it does not damage seat ring 40 at its point of contact therewith.

The other vertical wall of the groove includes an upstanding or vertical wall provided by surface 63 of valve housing portion 60 and a lug or protrusion 64 that extends perpendicular to surface 63. Protrusion 64 includes a nose portion surface 65 which is substantially parallel with surface 63 and includes radially inward wall 66 and radial outward wall 67 which form the two side surfaces of lug 64.

Again, with reference to FIG. 3, the wall on the right-hand side of the seat receiving groove continues past the lug 64 but is cut away at 68 to provide clearance when the seat ring pivots under the influence of the cryogenic fluid.

Referring to the cross sectional view of seat ring 40 that is visible in FIG. 3, it can be seen that the seat ring includes a sealing lip portion 50, a heel portion 51 and portion 52 of reduced thickness that bridges lip 50 and heel 51. Reduced thickness portion 52 is the portion of the resilient seat ring that remains after groove or notch 53 is formed or cut into one side of the seat ring.

The seat ring has an outer circumferential surface 45 which, when seen in cross section, constitutes that portion of the seat ring that is in contact with the bottom surface 62 of the seat receiving groove. Heel 51 of the seat has sidewalls 41 and 42 and, with particular reference to FIG. 3, sidewall 41 also extends in the region of reduced thickness portion 52 of seat 40. Sidewall 41 of seat 40 is in contact with surface 33 of seat retaining ring 30 while the sidewall 42 on the opposite side of heel 51 is in contact with wall 63 of portion 60 of the valve housing.

Notch 53 is cut or formed into the side of the seat ring that is bounded by surface 42 and includes side surfaces 46 and 47 and a valley surface 48. When the seat ring is placed into the seat receiving groove as shown in FIG. 3, lug 64 protrudes into notch 53 so that the nose surface 64 of lug 64 presses into valley surface 48 of notch 53. This contact pressure between faces 65 and 48 will provide a sealing contact between seat ring 40 and valve housing 11. The contact between sidewalls 63 and 42 and sidewalls 41 and 33 may be snug enough to provide some sealing action but, as previously described, relative motion must be possible between these surfaces during the temperature induced shrinkage of seat ring 40 when it is exposed to a cryogenic fluid. Side surface 46 of groove 53 faces side surface 66 of lug 64 and a similar relationship exists for surfaces 47 and 67. FIG. 3 illustrates the cryogenic valve at ambient temperatures, and at these temperatures a clearance exists between faces 46 and 66 and between faces 47 and 67. The purposes of these clearances will be discussed in greater detail below.

Figure 2:
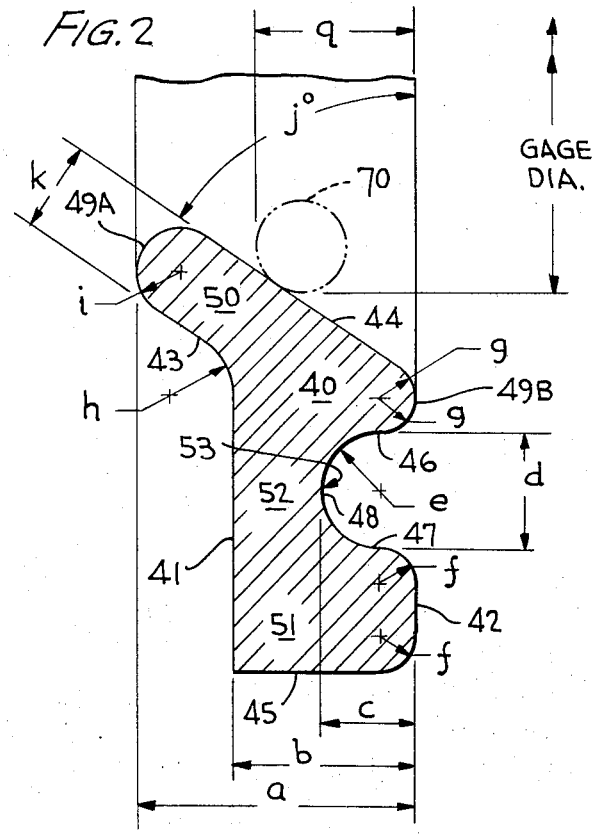
FIG. 2 is a cross sectional representation of a portion of the annular seat ring employed in the cryogenic valve of the instant invention.

Seat ring 40 has, as its innermost portion, a sealing lip portion 50 which includes a sealing face 44 and two rounded end portions 49A and 49B (FIG. 2). Sealing surface 44 of seat ring 40 is adapted to engage sealsurface 22 of butterfly disc 20 so that an interference fit I is established when the seat ring is installed in the groove at ambient temperature. This interference is indicated in FIG. 3 by the letter I, but it is to be understood that the pressure of surface 22 of the butterfly disc 20 against lip 50 of the seat ring will cause a bending of the lip so that surface 43 on lip 50 approaches surface 32 of the seat retaining ring 30. Seat ring 40 is made of a material that is capable of such a bending or a flexing when exposed to all temperatures in the design range of the valve.

As mentioned, FIG. 3 illustrates a clearance between surfaces 47 and 67 and a clearance between surfaces 46 and 66, both clearances existing at ambient temperature. When the valve is exposed to the low temperatures of a cryogenic fluid, the components of the valve begin to shrink. In order to maintain effective sealing action between the seat ring 40 and disc 20, it is necessary to maintain contact between surfaces 22 and 44 while the respective components of the valve are shrinking and then, further, to maintain this contact after the valve reaches a equilibrium temperature with the cryogenic fluid being controlled.

Exposure to the cryogenic fluid causes the entire seat ring 40 to shrink. Both the outside diameter of the ring (measured along a diameter of exterior curved surface 45) and the inside diameter (measured along a diameter contacting the radially innermost portion of end 49A of the seat) will decrease as the seat ring shrinks. Surfaces 41 and 42 will slide along their corresponding groove wall surfaces 33 and 63 while such shrinkage is occurring.

As the shrinkage of the seat ring continues, the radially outermost wall 47 of notch 53 will contact side surface 67 of lug 64. It is believed that the stresses generated in the seat ring, by the continued shrinkage being countered by the contact of surfaces 47 and 67, will pivot seat ring 40 about lug 64 in a clockwise direction as seen in FIG. 3. Such a pivoting will tend to rotate lip 50 into the sealing surface of disc 20 and will, if proper dimensional relationships are maintained, continue exerting a sealing force against disc 20 despite the continued shrinkage of the seat ring and the disc. At the same time, the contact between surface 67 of lug 64 and surface 47 of groove 53 prevents too large a shrinkage of the seat. Thus, the amount of torque necessary to turn the butterfly disc will not increase by too great an amount over the torque required to open the butterfly valve at ambient temperature.

EXAMPLE

Both the valve body 11 and the disc 20 may be formed of 316 stainless steel and shaft 15 may be formed from a high strength stainless steel. The seat ring 40 may be formed of Kel-F and the shaft seals and bearings may be formed of a glass filled Teflon mechanically bonded to a stainless steel backing. Seat retaining ring 30 is also formed of 316 stainless steel.

Appropriate dimensions for a butterfly valve commonly referred to as an 8-inch butterfly valve will be discussed with reference to the dimensions indicated by lowercase letters on FIGS. 1 and 2.

Dimension $a$, commonly referred to as the height of the seat is 0.375 inches; dimension $b$, commonly referred to as the height of the heel, is 0.250 inches; and dimension $c$, commonly referred to as the height or the depth of groove 53, is 0.125 inches. Dimension $d$, known as the width of groove 53 is 0.170 inches and the radius indicated by the letter $e$ is 0.08 inches. Both radii at $f$ are 0.04 inches and the radii at $g$ may be any convenient radius to blend the two adjoining surfaces into a smooth continuous surface. The radius at $h$ is three thirty-seconds of an inch and the radius at $i$ is 0.06 inches.

Angle $j$ formed between sealing surface 44 of the seat ring 40 and side surface 42 of seat ring 40 is 56° and the thickness $k$ of lip 50 is 0.125 inches.

The outside diameter of the entire ring measured across a diameter of surface 45 is 8.615 inches and, of course, the diameter of the groove measured along a diameter of surface 62 is nominally the same diameter so that the seat ring may fit snugly within the groove when the valve is at ambient temperature. This diameter is indicated by the letter $l$ in FIG. 1.

The width of lug 64 as measured from surface 66 to 67 of the lug and indicated by letter $m$ in FIG. 3 is 0.125 inches and the distance between surface 67 of lug 64 and surface 62 of portion 60 of the valve body is 0.188 inches (letter $n$ on FIG. 3). With a lug width of 0.125 inches and a notch width of 0.170 inches, clearance spaces of about 0.015 inches exist between surfaces 46 and 66 and 0.030 inches between surfaces 47 and 67.

Dimension $o$, measured between surface 63 and the nose surface 65 of lug 64 is 0.132 inches and the width $p$ of the seat receiving groove, as measured between surfaces 63 and 33 is slightly less than the previously mentioned heel height of 0.250 inches. This slight interference will provide some sealing action yet will permit relative motion between the seat and the groove as the ring is shrinking under the influence of the cryogenic fluid. The distance between surface 62 and point 31 is approximately five-sixteenths inches.

Interference $I$, shown in FIG. 3, is approximately 0.03 inches at its widest point and, from test results to be shown below, it will be seen that the ability of the valve to maintain the seal is retained over the entire temperature range of the valve. As discussed above, it is believed that the pivoting of the shrinking seat ring about lug 64 tends to bias the sealing lip 50 and its sealing surface 44 towards surface 22 of disc 20.

The disc used in the above discussed 8-inch butterfly valve had a converging surface with an angle of 74° (as measured from the same plane as the seat angle) and a major diameter (right-side of disc in FIG. 3) of 7.625 inches. It is understood, of course, that different angles and diameters may be employed depending on design requirements.

In actual tests with gaseous helium of an 8-inch valve of the present invention, the following leakage in standard cubic feet per hour (scfh) was observed after a given number of cycles of opening and shutting the valve and at various given pressures across the closed disc. In the case of zero cycles, the leakage was 0.02 scfh with a pressure of 10 psi; 0.03 scfh at a pressure of 30 psi; and 0.08 scfh at a pressure of 100 psi. After 500 cycles of opening and closing, the leakage was 0.50 scfh at a pressure of 10 psi; a leakage of 0.70 scfh at 30 psi; and a leakage of 0.75 scfh at a pressure of 100 psi. The initial torque necessary to open the valve before the cycles were performed was 360 ft. lbs. while the torque required to open the valve after the 500 cycles were performed was 350 ft. lbs. It is to be noted that both the zero cycle and the 500 cycle tests were performed at minus 320°F and that a commercially acceptable standard cubic feet per hour leakage at this temperature and 100 psi would be 5 standard cubic feet per hour. As is apparent, the values obtained were significantly lower than this figure.

The maximum flow capacity of the 8-inch cryogenic butterfly is 2,100 gallons of fluid per minute at 1 pound per square inch pressure drop across the valve.

A convenient method by which production seats may be inspected for dimensional accuracy without the calculation of the trigonometry of the seat angles is performed with a gauge diameter test. The seat is placed in a frame or collet with surface 41 pointing in a downward direction and a gauge tool is set across the seat and in contact with surface 42 of the seat. The gauge tool has attached thereto a ring 70 (FIG. 2) that is a fixed distance from the surface of the gauge tool that contacts surface 42 of the seat. The outer diameter of ring 70, designated as the gauge diameter in FIG. 2, is a standard value of 7.557 inches and, if the dimensions of the production seat are accurate and true, ring 70 will contact surface 44 of seat ring 40 at a depth indicated by the letter $q$ in FIG. 2 of 0.224 inches. The cross sectional diameter of the portion of the ring 70 visible in FIG. 2 is 0.125 inches.

We claim:

1. A rotary valve comprising a valve housing with a flow channel passing therethrough
   a valve closure member rotatably mounted in said housing with a sealing surface circumscribing said member,
   and annular seat means disposed to cooperate with said sealing surface to interrupt flow through said valve when said closure member is rotated into the closed position,
   said annular seat means mounted with respect to said sealing surface to permit controlled shrinkage in the radially inward direction of said seat means upon exposure to low temperature, and means tending to pivot at least a portion of said seat ring toward said sealing surface with a controlled movement in response to forces generated by said shrinkage of said seat means upon exposure to low temperature.

2. The valve of claim 1 wherein said valve closure member is a butterfly disc and said sealing surface circumscribing said member is disposed about the edge of said disc.

3. The valve of claim 2 wherein said sealing surface is a portion of a converging surface, said annular seat means has a complementarily shaped sealing surface thereon, and said disc sealing surface and said annular seat means sealing surface are oriented to each other to produce an interference fit when said disc is in said closed position.

4. The valve of claim 3 wherein said shaft and said valve housing are extended so that a bonnet on said valve is displaced from said disc by an amount to protect an actuator on said bonnet from the temperature effects of the fluid to be controlled by the valve.

5. The valve of claim 2 wherein said annular seat means is carried in a groove formed in said housing, and said groove has a first sidewall and a second sidewall.

6. The valve of claim 5 wherein said first sidewall, when viewed in cross section, has a lug projecting therefrom.

7. The valve of claim 6 wherein said means tending to pivot said seat means toward said sealing surface includes said lug and a cooperating notch formed in said seat means.

8. The valve of claim 7 wherein said notch is wider than said lug whereby a clearance space exists between said seat ring and said notch on both sides of said notch when said valve is at ambient temperature.

9. The valve of claim 8 wherein said controlled shrinkage is such that, below ambient temperature, the radially outward side of said notch contacts the facing side of said lug and the resulting stresses tend to pivot a portion of said seat means in the described manner.

10. The valve of claim 8, wherein the thickness of said annular seat means is dimensioned with respect to the width of said groove so as to permit relative movement between said annular seat means and said groove during shrinkage of said annular seat means.

11. The valve of claim 10, wherein the mounting of said annular seat means includes the thickness of said annular seat means at said notch being dimensioned so that a slight interference fit is provided between said lug and said notch to assure sealing action and, at the same time, to permit relative motion between said annular seat means and said housing during shrinking of said annular seat means.

12. The valve of claim 11, wherein said controlled shrinkage is such that, below ambient temperature, the radially outward side of said notch contacts the facing side of said lug so as to pivot a portion of said seat means toward said sealing surface.

13. The valve of claim 12, wherein said sealing surface is a portion of a converging surface, said annular seat means having a complementary-shaped sealing surface thereon, and said valve closure member sealing surface and said annular seat means sealing surface being oriented with respect to each other so as to produce an interference fit when said valve closure member is in said closed position.

14. A butterfly valve seat ring for use in cryogenic applications comprising, when viewed in cross section, a heel portion adapted to be engirded in sliding relationship in a groove, a lip portion with a sealing surface thereon and adapted to engage a sealing surface of a valve closure member and a notch formed in the side of said seat ring, the radially outward side surface of said notch constituting means that, in cooperation with a lug member disposed within said notch, will tend to pivot said lip portion of said seat ring toward said sealing surface during shrinkage of said seat ring induced by exposure to low temperatures.

\* \* \* \* \*